United States Patent
Zentgraf

(10) Patent No.: US 7,133,815 B2
(45) Date of Patent: Nov. 7, 2006

(54) METHOD AND SYSTEM FOR BALANCING THRUST DEMANDS

(75) Inventor: Peter Zentgraf, Munich (DE)

(73) Assignee: Astrium Limited, Hertfordshire (GB)

( * ) Notice: Subject to any disclaimer, the term of this patent is extended or adjusted under 35 U.S.C. 154(b) by 0 days.

(21) Appl. No.: 10/505,140

(22) PCT Filed: Feb. 19, 2003

(86) PCT No.: PCT/GB03/00708

§ 371 (c)(1),
(2), (4) Date: Aug. 19, 2004

(87) PCT Pub. No.: WO03/070570

PCT Pub. Date: Aug. 28, 2003

(65) Prior Publication Data

US 2005/0119803 A1    Jun. 2, 2005

(30) Foreign Application Priority Data

Feb. 20, 2002    (GB)    ................................ 0203950.1

(51) Int. Cl.
G01C 23/00    (2006.01)
(52) U.S. Cl. ............................................. 703/13; 703/3
(58) Field of Classification Search ................ 701/3–4, 701/13–16; 700/28, 31, 44, 45, 89; 318/561, 318/606
See application file for complete search history.

(56) References Cited

U.S. PATENT DOCUMENTS

| 3,917,929 A | 11/1975 | Reinhart |
| 4,837,699 A * | 6/1989 | Smay et al. .................. 701/13 |
| 5,130,931 A | 7/1992 | Paluszek et al. |
| 5,310,143 A | 5/1994 | Yocum et al. |
| 5,335,179 A | 8/1994 | Boka et al. |
| 5,349,532 A * | 9/1994 | Tilley et al. ................. 701/226 |

(Continued)

FOREIGN PATENT DOCUMENTS

GB    2 268 138 A    1/1994

(Continued)

OTHER PUBLICATIONS

Kang et al., On compensating nonlinear distortions of an OFDM system using an efficient adaptive predistorter, IEEE Trans. on Comm. vol. 47, No. 4, Apr. 1999 (5 pages).*

(Continued)

Primary Examiner—Cuong Nguyen
(74) Attorney, Agent, or Firm—Crowell & Moring LLP

(57) ABSTRACT

In the control of spacecraft, thrusters must generate a commanded force or torque that is computed from the control algorithms in order to maintain a certain attitude or orbit. In general, there is an infinite number of solutions as to how the thrusters are fired in order to achieve the commanded value. However, additional imposed constraints on the mass flow allow only a small subset of those solutions to be feasible. By way of example, two constraints are considered in this invention: first, the mass flow of each thruster must exceed a minimum value and second, the total mass flow of all thrusters for any generated force/torque must be constant. If only a non-feasible solution is found, known methods turn it into a feasible one by reducing the commanded force/torque until the constraints are met. Reducing the commanded force/torque is, however, a disadvantage because the performance may decrease and even lead to instability of the closed loop system. This invention concerns a simple and time efficient method/system for improving an unfeasible solution in such a way that reducing the commanded force/torque can be minimised or even completely be avoided and, therefore, higher feasible generated forces/torques than those with known methods can be generated.

9 Claims, 13 Drawing Sheets

U.S. PATENT DOCUMENTS

| | | | |
|---|---|---|---|
| 5,850,992 A * | 12/1998 | Flament et al. | 244/168 |
| 5,884,869 A * | 3/1999 | Fowell et al. | 244/169 |
| 6,141,606 A * | 10/2000 | Reckdahl | 701/13 |
| 6,205,387 B1 * | 3/2001 | Ochiai | 701/51 |
| 6,330,483 B1 * | 12/2001 | Dailey | 700/28 |
| 6,341,749 B1 * | 1/2002 | Ocampo | 244/158.5 |
| 6,347,262 B1 * | 2/2002 | Smay et al. | 701/13 |
| 6,463,365 B1 * | 10/2002 | Anagnost et al. | 701/13 |
| 6,786,896 B1 * | 9/2004 | Madhani et al. | 606/1 |
| 6,937,968 B1 * | 8/2005 | Carrico et al. | 703/8 |

FOREIGN PATENT DOCUMENTS

| | | | |
|---|---|---|---|
| GB | 2268138 A | * | 1/1994 |

OTHER PUBLICATIONS

Mason A Peck, Control-moment gyroscopes for joint actuation: a new paradigm in space robotics, American Institute of Aeronautics and Astronatics, pp. 1-31.*

Sarkar et al., Coordinated motion planning and control of autonomous underwater vehicle-manipulator systems subject to drag optimization, IEEE Jour. of Oceanic Engineering, vol. 26, No. 2, Apr. 2001.*

Zentgraf, and Chapman et al., Drag-free control analysis and algorithm design for the STEP mission, ESA/ESTEC contract 15139/01/NL/HB.*

* cited by examiner

Fig.3.
Force/torque demand profile #2
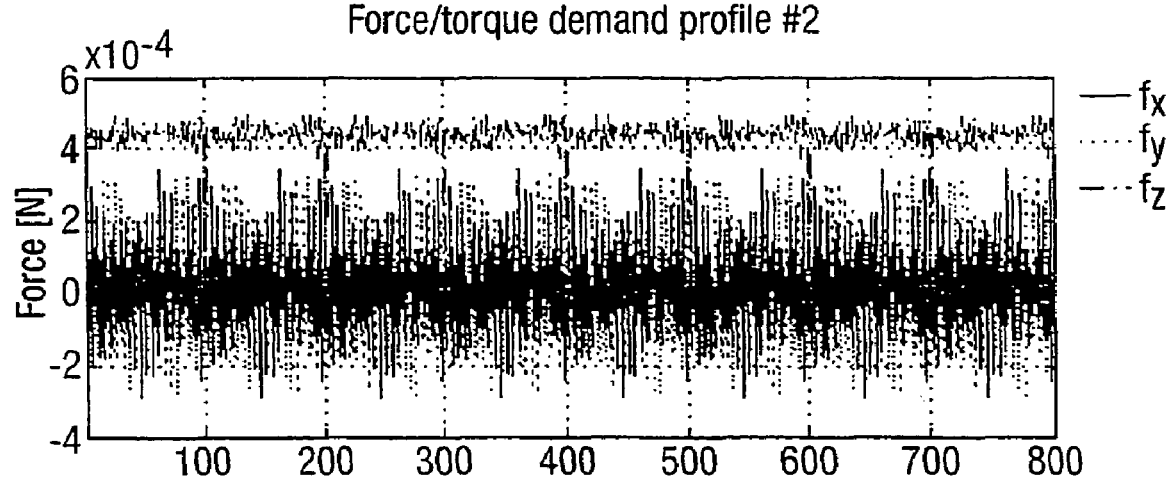
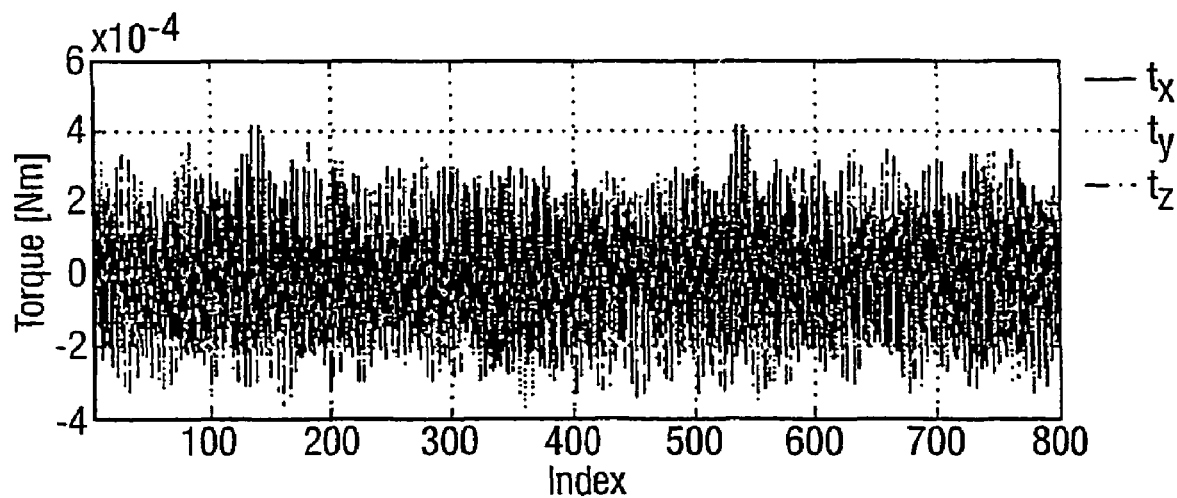

Fig. 8.
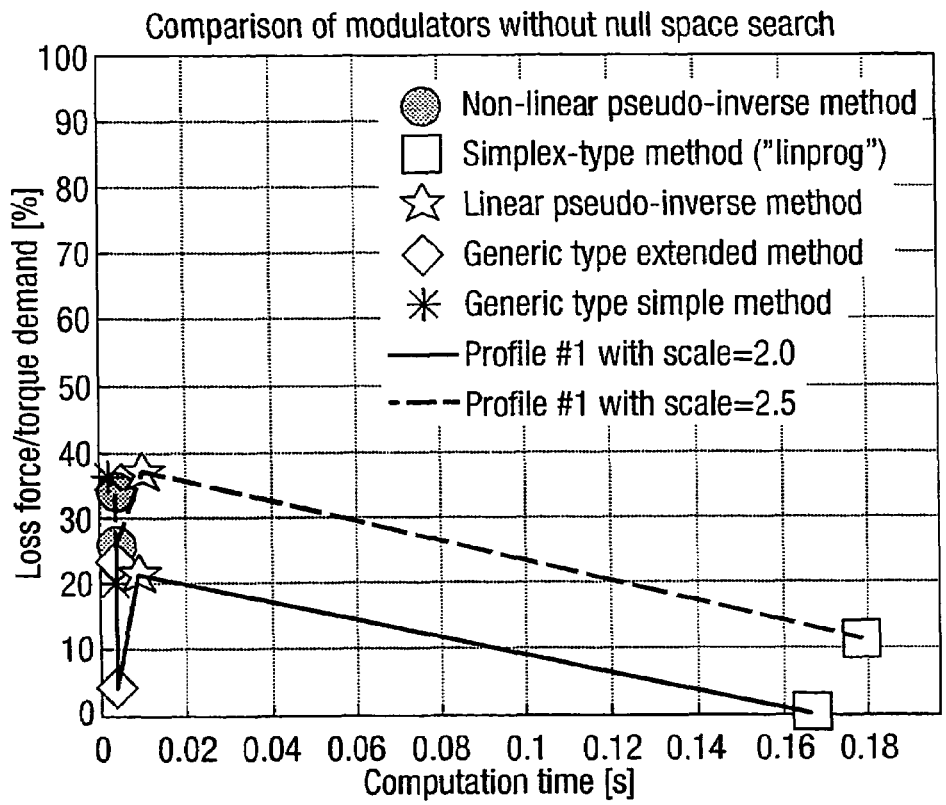
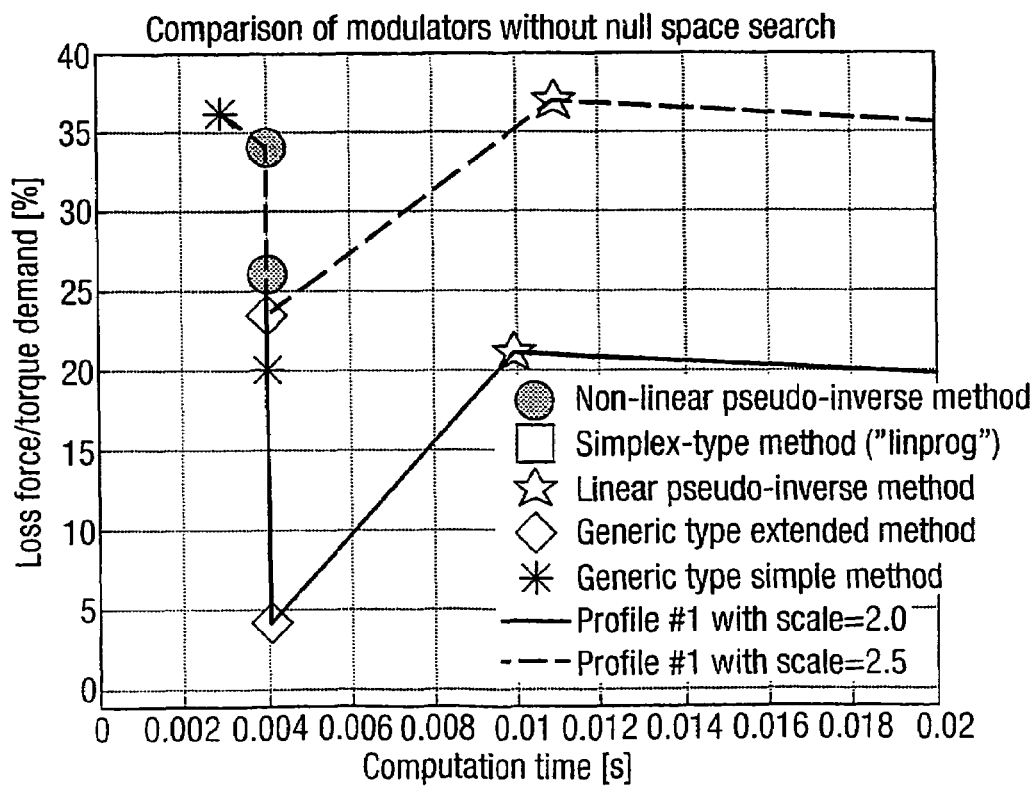
All modulators without null space search

Fig. 8 (Cont).
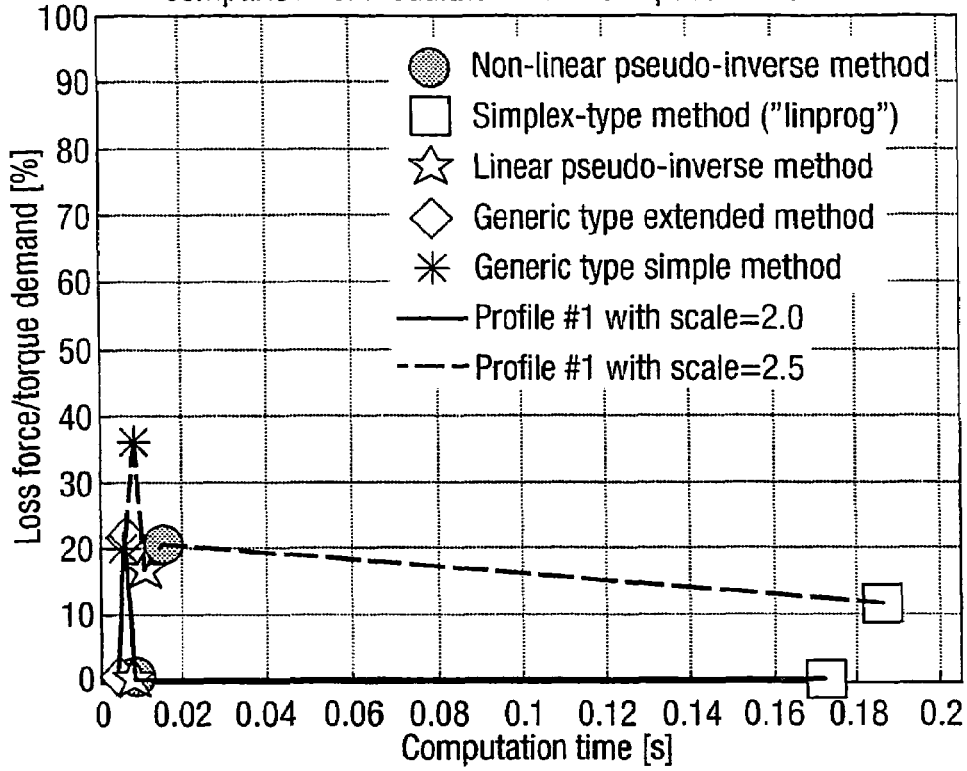
Comparison of modulators with null space search
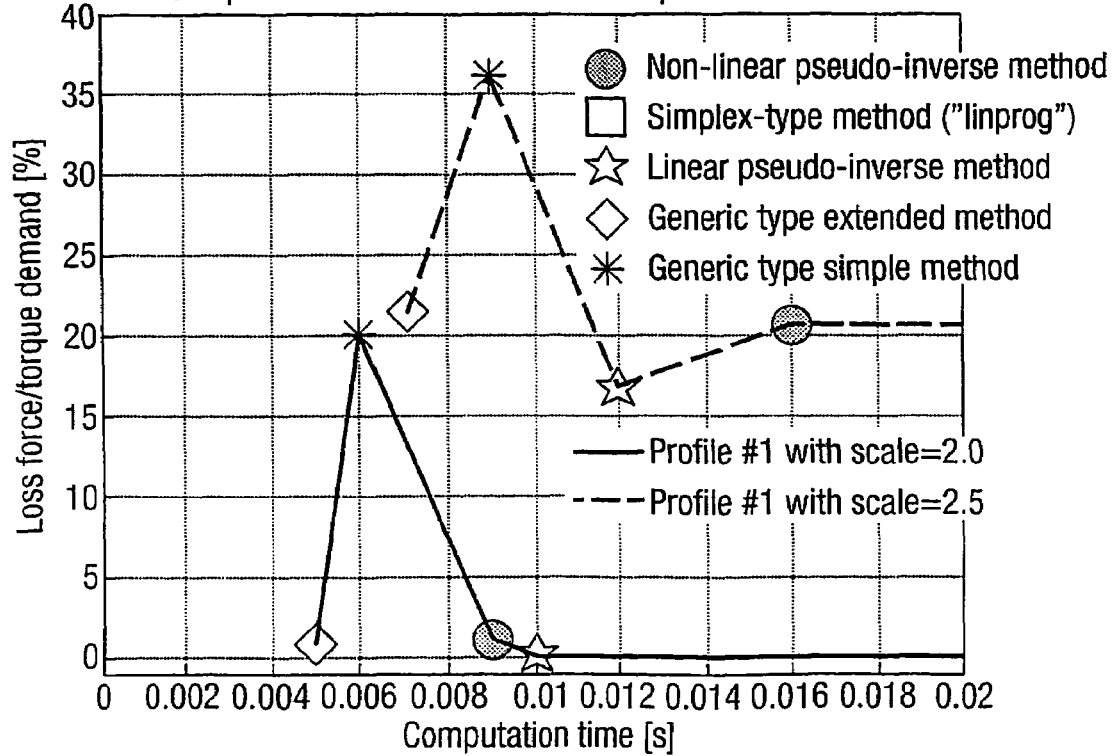
Comparison of modulators with null space search
All modulators with null space search

Fig.9.
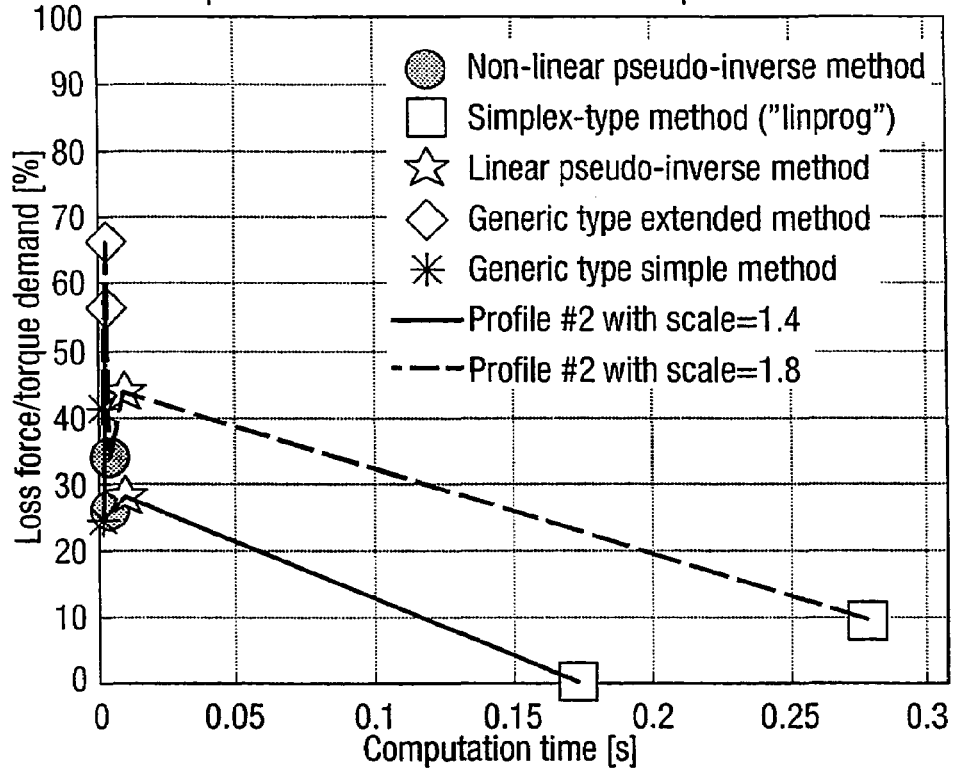
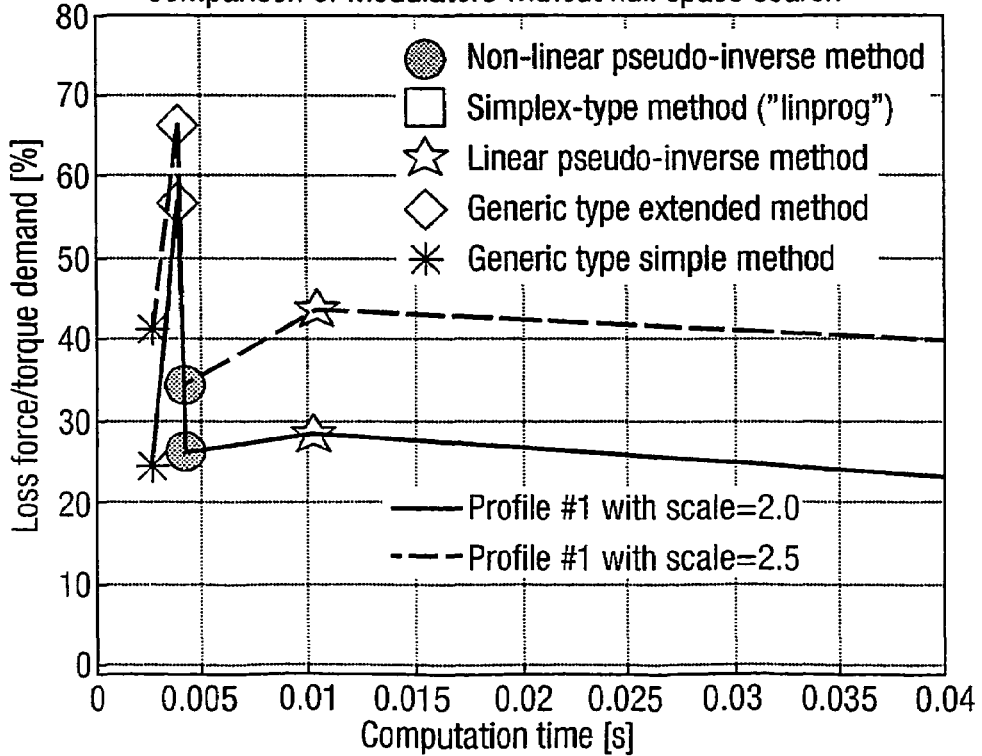
All modulators without null space search

Fig.9 (Cont).
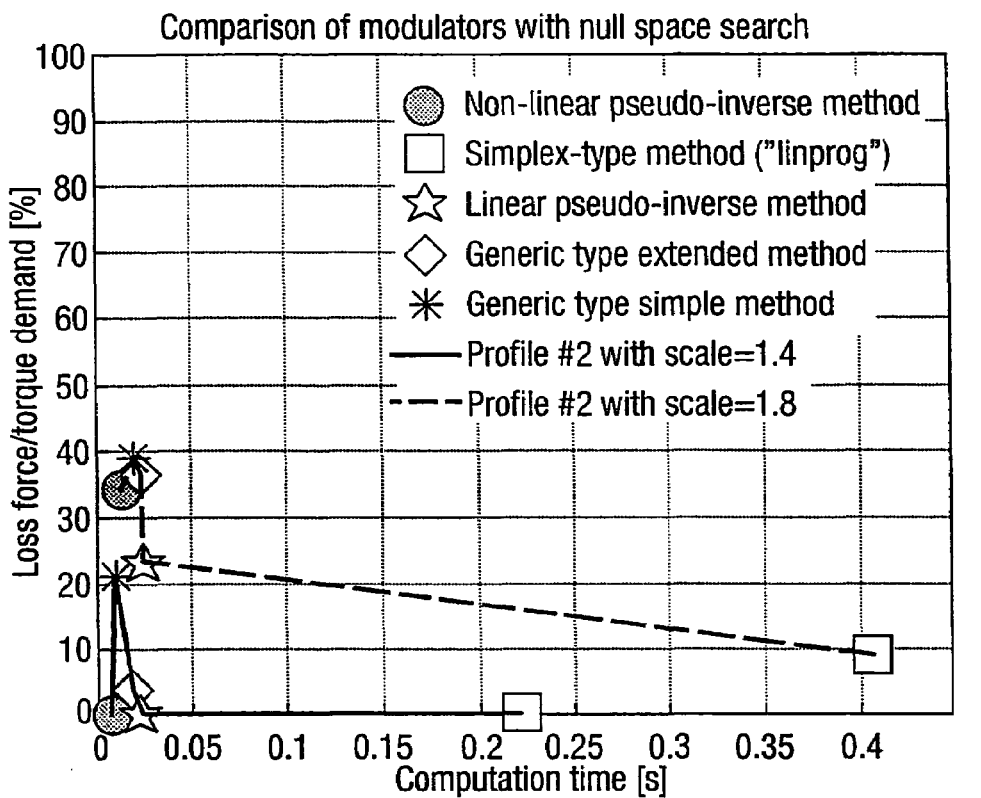
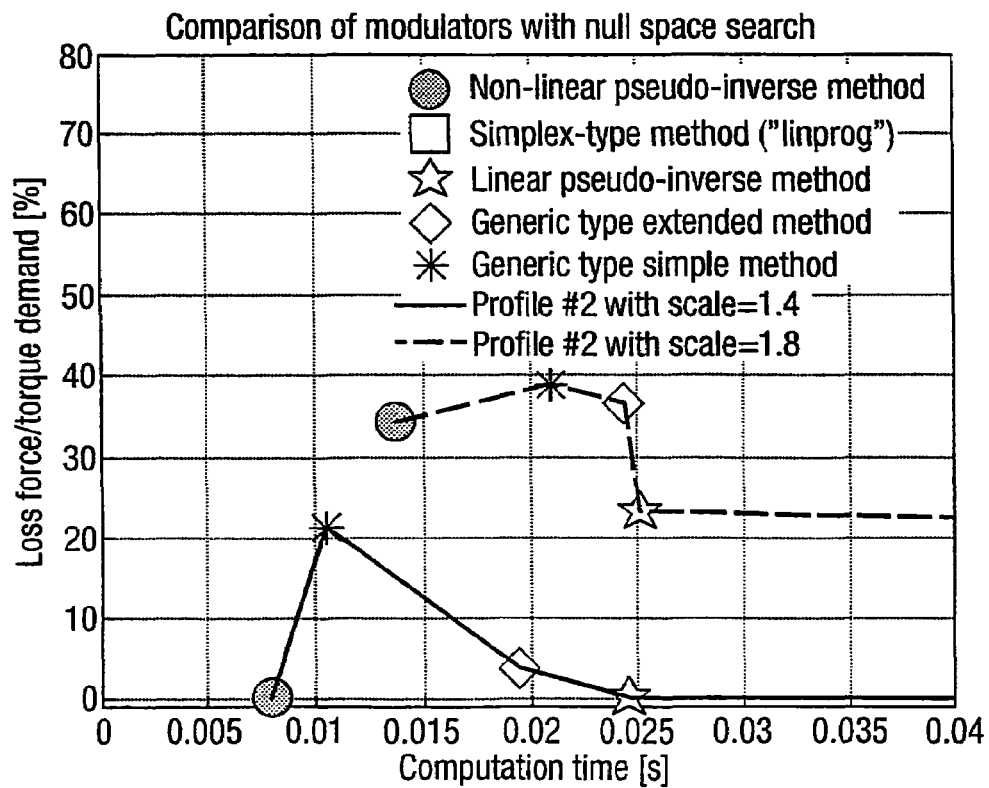
All modulators with null space search

Fig.10.
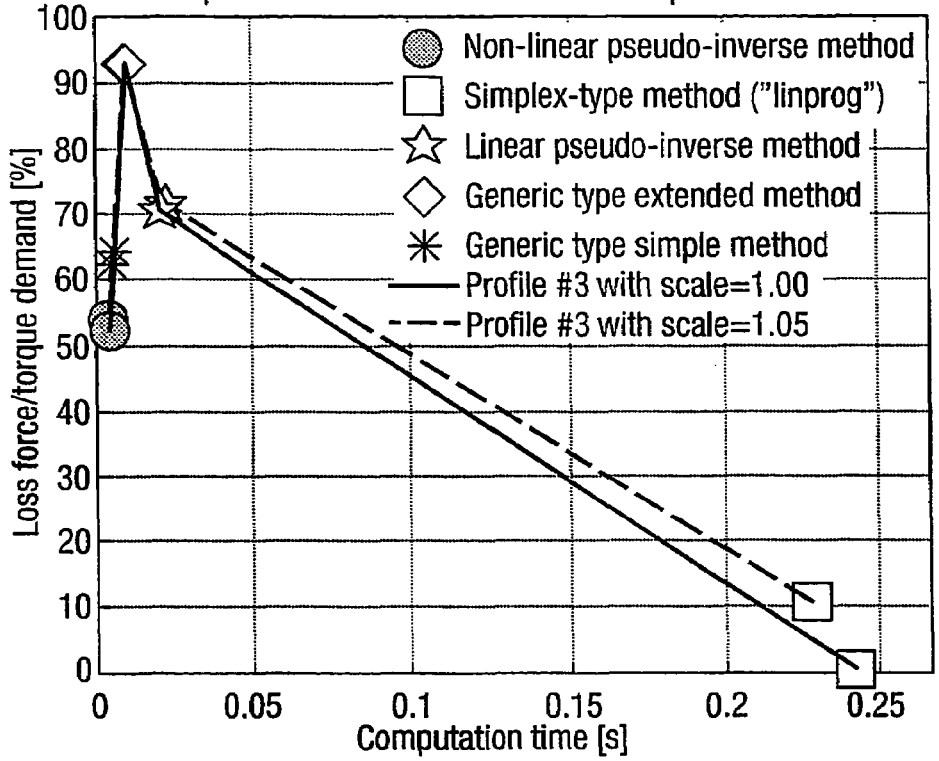
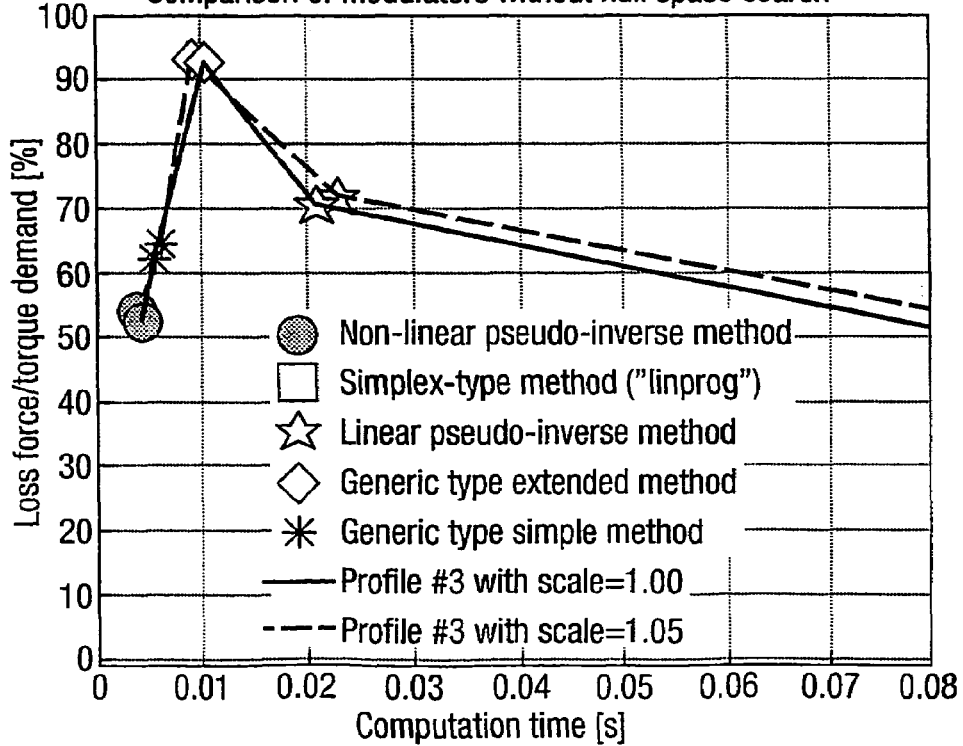
All modulators without null space search

Fig. 11 (Cont).
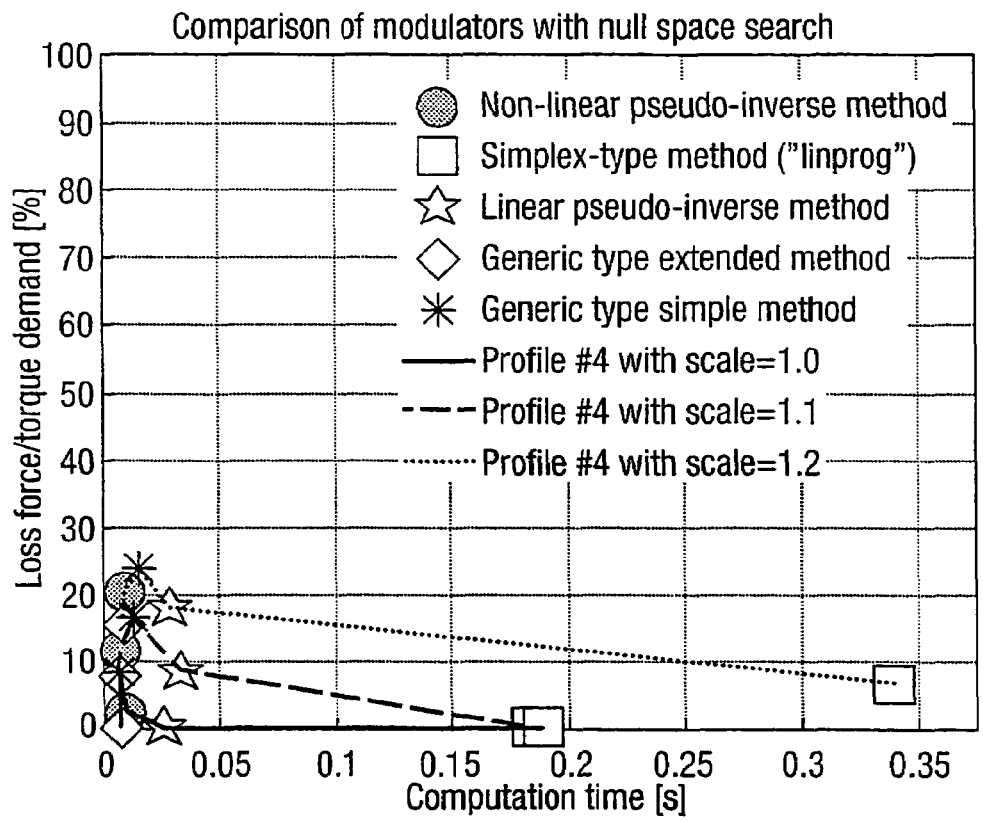
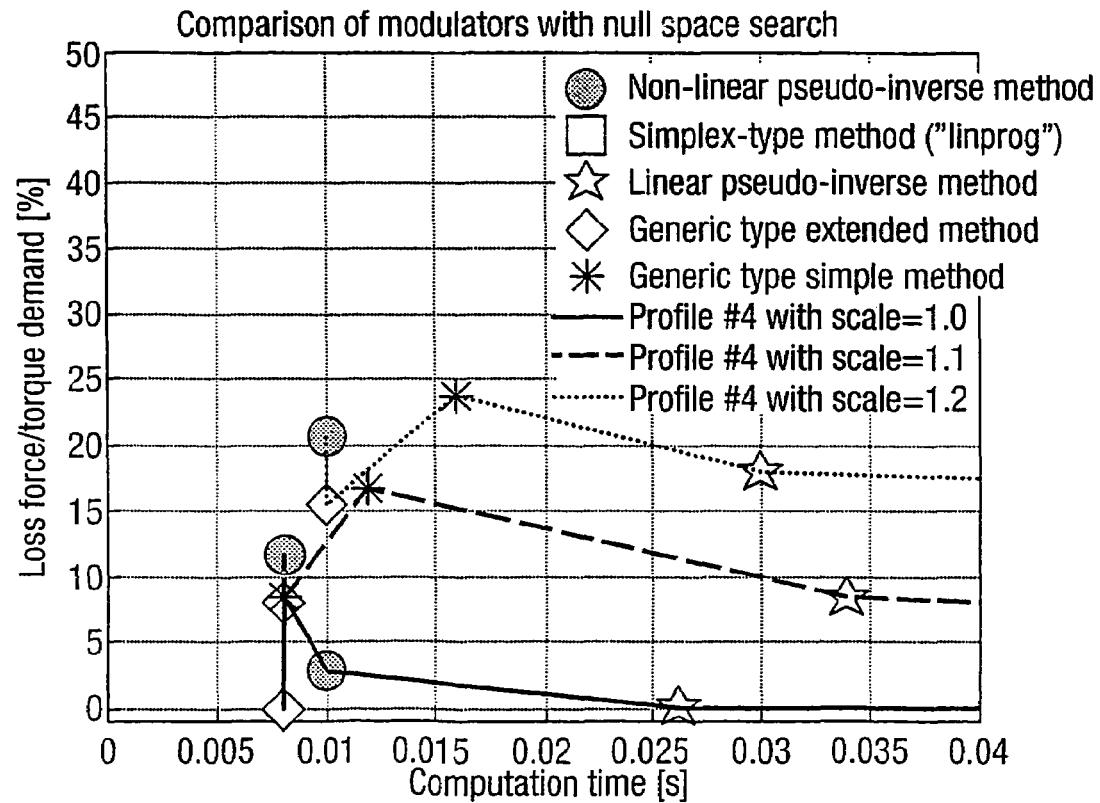
All modulators with null space search

METHOD AND SYSTEM FOR BALANCING THRUST DEMANDS

FIELD OF THE INVENTION

The present invention relates to a method and system for balancing thrust demands, and more particularly, but not exclusively, concerns a method and system for balancing thrust demands for attitude and translation control of spacecraft.

BACKGROUND OF THE INVENTION

An important issue during the design of an attitude and translational control system for spacecraft is the modulation of commanded control forces and torques towards the thrusters. The design gets even more challenging if additional constraints are taken into account, for instance the requirement that the total mass flow remains constant and that each thruster generates a predefined minimum thrust.

The known modulating algorithm proposed in Hai Ping Jin, Peter Wiktor, and Daniel B Debra's report, "An Optimal Thruster Configuration Design and Evaluation for Quick Step," 13th IFAC Symposium—Automatic Control in Aerospace—Aerospace Control 1994, Sep. 12–16, 1994 aims to tackle the design issue mentioned above. A principal drawback of this known method, however, is that the constraints cannot be satisfied for high control demands with respect to the ideal maximal thrust which can be generated from the thrusters. The reason for this drawback is that only a small fraction of the thruster null-space is used for the modulation. In contrast, the null space search algorithm of the present invention, as proposed hereinafter, uses the complete null space and therefore higher control demands while satisfying additional constraints can be generated. Another advantage associated with the present invention is that the proposed null space search algorithm is fast and compatible for application to any modulator and therefore can be used to improve any thruster signal proposed by any modulator.

OBJECTS AND SUMMARY OF THE INVENTION

The present invention aims to overcome or at least substantially reduce some of the above-mentioned drawbacks.

It is an object of the present invention to provide an improved method and system for balancing thrust demands with a capability to enhance the performance for thruster modulation by generating higher feasible forces/torques than would otherwise be generated using known methods/systems, whilst satisfying the prescribed constraints.

It is another object of the present invention to provide a simple, cost-effective and time efficient method of utilising the complete null space, enabling high control demands to be generated whilst satisfying additional constraints. In this connection, it is to be understood that the null space search algorithm for use in the present invention is fast, reliable and compatible for application to any modulator and can be effectively used to improve upon any thruster signal proposed by any modulator.

In broad terms, the present invention resides in the concept of generating a number of thrust command signals for a plurality of thrusters and processing the thrust command signals in a simple, logical fashion so as to (1) identify exactly which of the thrust demands associated with the thrusters do or do not satisfy predetermined constraints and (2) balance the various thrust demands in such a way that each of the thrusters can operate in accordance with the predetermined constraints.

Therefore, according to the present invention, there is provided a method of balancing thrust demands comprising the steps of: (a) controllably generating a number of thrust command signals for application to a plurality of thrusters; (b) comparing the levels of the generated thrust command signals in relation to a number of predetermined constraints; (c) identifying which of the thrust demands associated with said plurality of thrusters can operate in accordance with said predetermined constraints and which of the thrust demands associated with said plurality of thrusters can not operate in accordance with said predetermined constraints; and (d) balancing the various thrust demands such as to permit each of the thrusters to operate in accordance with said predetermined constraints.

In this way, available thrust is used in the invention to a higher extent than in conventional techniques and at the same time, the prescribed constraints of the thrusters are suitably satisfied.

In accordance with an exemplary embodiment of the invention which will be described hereinafter in detail, the balancing step is performed by shifting a predetermined amount of thrust demand associated with particular thrusters operating in accordance with said predetermined constraints to one or more of the thrusters which do not operate in accordance with said predetermined constraints.

Advantageously, the balancing step is effected by application of a predetermined combination of null space vectors.

Advantageously, the predetermined constraints are selected so that (i) the thrust demand associated with each of said plurality of thrusters is more than a predetermined value and (ii) the total mass flow associated with said plurality of thrusters is constant.

Conveniently, the method of the invention further comprises the step of modulating a number of forces/torques to provide said number of thrust command signals. Further, it is to be appreciated that the balancing step and the modulation step are conveniently effected independently of each other.

Advantageously, the modulation step is effected by means of a non-linear pseudo-inverse modulator.

The present invention extends to a system for balancing thrust demands comprising: means for controllably generating a number of thrust command signals for application to a plurality of thrusters; means for comparing the levels of the generated thrust command signals in relation to a number of predetermined constraints; means for identifying which of the thrust demands associated with said plurality of thrusters can operate in accordance with said predetermined constraints and which of the thrust demands associated with said plurality of thrusters can not operate in accordance with said predetermined constraints; and means for balancing the various thrust demands such as to permit each of the thrusters to operate in accordance with said predetermined constraints.

The present invention further extends to a spacecraft system adapted and arranged to carry out the above described method.

The present invention is advantageously embodied in software.

The above and further features of the invention are set forth with particularity in the appended claims and will be described hereinafter with reference to the accompanying drawings.

BRIEF DESCRIPTION OF THE DRAWINGS.

FIGS. 2 to 5 show typical force/torque demand profiles which can be realised by use of the invention;

FIGS. 8 to 11 show some typical results for various kinds of modulator as obtained with/without the inventive null space search of the invention.

DETAILED DESCRIPTION OF AN EXEMPLARY EMBODIMENT

1. Thruster Modulation Algorithm

Figure 1:
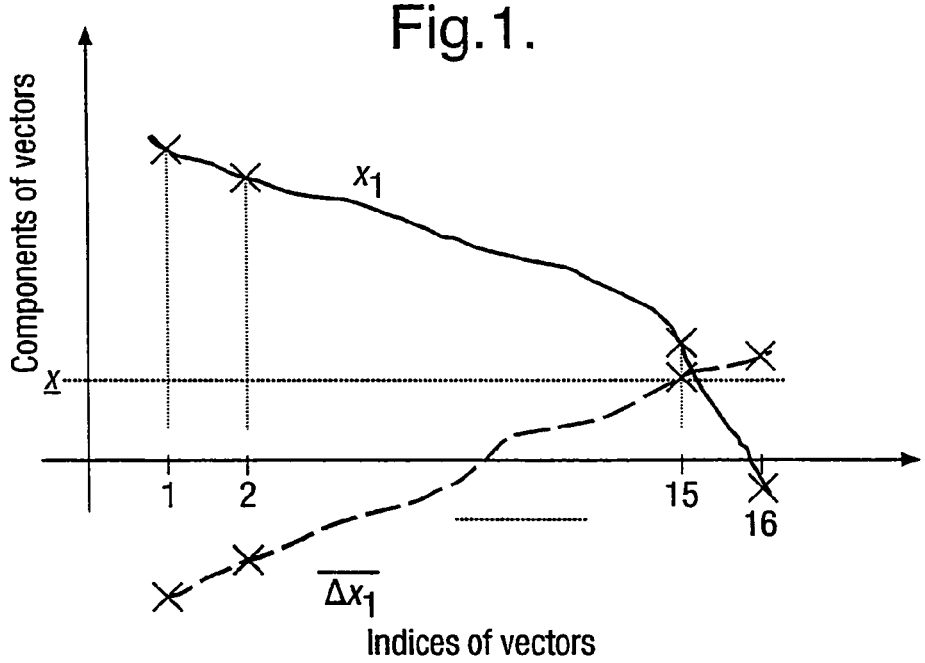
FIG. 1 shows a graphical display of null space vector components for use in the invention.

Having regard to the foregoing, the present invention deals with the following technical problem: For example, given 6 values of the force/torque demand of the controller, how do the associated 16 thrusters have to be fired to satisfy this demand, while at the same time ensuring that the total mass flow remains constant throughout the mission and that each thruster undergoes a certain minimum of mass flow?

The known modulator is the known non-linear pseudo-inverse algorithm given in Hai Ping Jin, Peter Wiktor, and Daniel B Debra's report, "An Optimal Thruster Configuration Design and Evaluation for Quick Step," 13$^{th}$ IFAC Symposium—Automatic Control in Aerospace—Aerospace Control 1994, Sep. 12–16, 1994. Further analysis which will be presented in the description hereinafter has shown that the performance of this known modulator is good unless the force and torque demands are too "high", but it is not able to use the total thrust available generated by the helium boiling off. It has been found that the known modulator fails already at a low force/torque demand level whereas the physical thrust available predicts that three times the level could be used. Since using the total thrust available would mean that the use of magnetic torque rods (MTQ) is no longer mandatory, emphasis is placed hereinafter on the design of an appropriate modulator.

In the following description, section 1.1 poses the technical problem to be addressed by the present invention. In section 1.2, different kinds of modulator are presented for use in the invention to solve the technical problem. All modulators presented hereinafter do not consider directly the prescribed mass flow constraints. Therefore, there might be zero or even negative mass flow components. This issue is taken care of equally for all modulators in sections 1.3 and 1.4 hereinafter. In section 1.5 it is to be noted that typical force and torque profiles are presented which are used for the modulators as open loop input signal. Finally, section 1.6 concludes with an evaluation of the generated results.

1.1 Technical Problem Statement

Find a modulator algorithm that solves the equation $$\underbrace{\begin{bmatrix} f \\ t \end{bmatrix}}_{:=b_{6\times1}} = \underbrace{\begin{bmatrix} -g*ISP* & & \\ v_1 & \cdots & v_{16} \\ (r_1-r_{COG})\otimes v_1 & \cdots & (r_{16}-r_{COG})\otimes v_{16} \end{bmatrix}}_{:=A_{6\times16}} \underbrace{\begin{bmatrix} mf_1 \\ \vdots \\ mf_{16} \end{bmatrix}}_{:=x_{16\times1}} \quad (1.1.1)$$

where f,t are force/torque demand, $mf_i$, $v_i$, $r_i$ are mass flow, direction and location of thruster i, g is the gravitational acceleration on Earth surface (~9.81 m/s$^2$), ISP=130 s is the specific impulse of the thrusters and $r_{COG}$ is the location of the spacecraft COG w.r.t. the centre of the thruster configuration.

and additionally solves the mass flow equation $$\sum_{i=1}^{i=16} mf_i = \sum_{i=1}^{i=16} x_i = mf = 1.5 \text{ mg/s} \quad (1.1.2)$$

as well as the minimum mass flow constraints $$\underline{x_i}=0.009375 \text{ mg/s} \leq mf_i \text{ for } i=1,\ldots 16 \quad (1.1.3)$$

Note that in this example, there are 16 thrusters (hence, I=1, . . . 16) but the number of thrusters in the invention is not critical so long as there are at least two thrusters.

1.2 Modulators

1.2.1 Linear Optimisation Modulator

Several modulators have been developed in this study. In order to evaluate the performance of the modulators with respect to the computational effort they are compared in their performance with the result of the solution of the Linear Optimisation problem; here, Matlab function "linprog" was conveniently used to solve the problem $$\underline{\text{Minimize}} \; \Sigma x_i \text{ while solving } Ax=b \text{ for } \underline{x_i} \leq x_i \leq \overline{x_i} \quad (1.2.1)$$

The description of Matlab function "linprog" claims to find the best possible solution for this problem. Therefore, the performance of this modulator is used as reference for the other modulators telling us what is physically possible to achieve.

The reason why the Linear Optimisation modulator was not implemented in the STEP-simulation model was the very large computation time, and therefore it seems unlikely to use that during the mission.

1.2.2 Non-Linear Pseudo-Inverse Modulator

This thruster modulation algorithm is the known non-linear pseudo-inverse algorithm given in Hai Ping Jin, Peter Wiktor, and Daniel B Debra's report, "An Optimal Thruster Configuration Design and Evaluation for Quick Step," 13$^{th}$ IFAC Symposium—Automatic Control in Aerospace—Aerospace Control 1994, Sep. 12–16, 1994. This algorithm modulates the thrust levels of the thrusters to provide desired force and torque vectors, whilst giving a constant mass flow rate.

It has already been found easy in simulations to saturate the thrusters, given their very low thrust levels. Typically the 10% of mean flow rate constraint is violated (rather than the high thrust limit). As originally implemented, the modulation algorithm 'cheats' under these circumstances, by providing the required force and torque vector, but doing so by exceeding the total flow rate. Under very noisy conditions, the flow rate can be much higher than can be supplied by normal He boil off.

1.3 Satisfaction of Mass Flow Equality Constraint

The mass flow equality (1.1.2) can be enforced, simply by adding components of the null space vector: The total mass $m_{tot}$ is scaled by adding to the mass flow vector x the vector $x_{diff}$ to yield $$x' = x + x_{diff} \quad (1.3.1)$$

where $$x_{diff}^T = \frac{mf - m_{tot}}{16}[1 \ 1 \ \ldots 1], \quad (1.3.2)$$

then the total mass flow m' is $$m' = \sum_{i=1}^{16}(x(i) + x_{diff}(i)) \quad (1.3.3)$$

$$= \sum_{i=1}^{16} x(i) + \sum_{i=1}^{16} x_{diff}(i) = m_{tot} + (mf - m_{tot}) = mf$$

always satisfying the mass flow equality.

1.4 Satisfaction of Minimum Mass Flow Constraints

The problem for all modulator algorithms is the satisfaction of the minimum mass flow constraints. Experiments show that those get easily violated if the force/torque demand increases.

1.4.1 Exploiting the Complete Null Space of Thruster Configuration

So far, the complete null space has not been exploited by any known method presented so far. The idea for use in the present invention is now to use "suitable" combinations of all null space vectors in order to put more thrust on those thrusters which violate the prescribed constraint(s) without changing the generated forces and torques.

Mathematically speaking, there is a vector $x_1$ with $$\sum_{i=1}^{16} x_1(i) = mf \quad (1.4.1)$$

solving $$b = A x_1 \quad (1.4.2)$$

having at least one component j that violates the minimum mass flow constraint, $$x_1(j) < \underline{x} \quad (1.4.3)$$

The problem is how to find a specific null space vector $\Delta x_1$ with $\Sigma \Delta x_1(j)=0$ such that $$x_1(j) < x_1(j) + \Delta x_1(j) \quad (1.4.4)$$

and "hopefully" also $$x_1(j) + \Delta x_1(j) > \underline{x} \quad (1.4.5)$$

because then the minimum mass flow constraint is satisfied.

Say the Matrix A in (1.4.2) has 6 rows and 16 columns and has full rank. Then the null space matrix $X_0$ has the dimension 16×10, i.e. any linear column vector combination of $X_0$ gives $$A[\lambda_1 x_{01} + \ldots \lambda_{10} x_{010}] = 0 \quad (1.4.6)$$

where $\lambda_1, \ldots \lambda_{10}$ are any scalars.

The solution procedure requires three steps. For simplicity but without limitation of the method, only one violation is considered.

Step 1.) Identify the violating thruster, say thruster j.

Step 2.) In the best case there is a null vector which strongly points in the direction of the thruster which violates the constraint. Adding this vector to the thrust would then ease the constraint violation. A good guess is the null vector $x^*_0$ which is computed below:

$$\lambda^* := (X_0^T X_0)^{-1} X_0^T \begin{bmatrix} 0 \\ \vdots \\ 0 \\ 1 \\ 0 \\ \vdots \\ 0 \end{bmatrix} \begin{matrix} \ldots 1 \\ \\ \ldots j-1 \\ .j \\ \ldots j+1 \\ \\ \ldots 16 \end{matrix} \quad (1.4.7)$$

$$x^*_0 = X_0 \lambda^* \quad (1.4.8)$$

Note that $x^*_0$ is a vector pointing "as strongly as possible" towards, because $\lambda^*$ is the least squares error solution of the "ideal" null space vector in (1.4.7). Now, from $x^*_0$ is a vector $\Delta x_1$ derived being properly scaled such that the sum of its components is zero:

$$\Delta x_1(\kappa) = \kappa \overline{\Delta x_1} \quad (1.4.9)$$

$$\overline{\Delta x_1} := x^*_0 - \frac{1}{16} \sum_{k=1}^{16} x^*_0(k) \begin{bmatrix} 1 \\ \vdots \\ 1 \end{bmatrix} \quad (1.4.10)$$

Note that κ is a free parameter which will be chosen properly.

Step 3.) Reorder now vector $x_1$ such that the elements decrease from the top to the bottom (so the index j becomes now index 16) components and apply the same ordering rule to $\Delta x_1$. The result is illustrated as a graphical display of vector components in FIG. 1.

As shown in FIG. 1, it is to be noted that the components of vector $x_1$ can now be interpreted as discrete function values. The "function" $x_1$ cannot increase and the Integral of the "function" $\overline{\Delta x_1}$ is always zero. "Hopefully", there will be a bulge $\overline{\Delta x_1}$ at index 16, such that the violating thrust may get more thrust from the null space vector than the other components of $x_1$. The technical problem addressed by the present invention can now be expressed in a more transparent way, namely:

Find that κ that maximises the minimum of the function $x_1 + \kappa \overline{\Delta x_1}$.

To achieve that, the derivative of $x_1 + \kappa \overline{\Delta x_1}$ is computed and set to zero, thus yielding 15 possible values for κ:

$$\frac{d(x_1 + \kappa \overline{\Delta x_1})}{d'' \text{indices of vectors''}} = 0 \Rightarrow \kappa = -\frac{dx_1}{d\overline{\Delta x_1}} \quad (1.4.11)$$

All possible values for κ in (1.4.1 1) are computed and this κ yielding the largest minimum of $x_1 + \kappa \overline{\Delta x_1}$ is taken. The process is repeated, until there is no further improvement.

It turns out that the null space search algorithm for use in the invention converges very fast, either to a "positive" solution or that it finds that there is no possible improvement.

The null space search algorithm can be advantageously used on any modulator for use in the invention in order to see if constraint violations can be removed.

1.4.2 Reduction of Force/Torque Demand in Case of Constraint Violations

If the minimum thrust constrained is still violated, the force/torque demand will be scaled down until this is no longer the case. Care must be taken such that the reduction is not larger than necessary.

In order that the system should behave realistically under such circumstances, a low thrust saturation characteristic has been designed and implemented for use in the invention. The null space search algorithm conveniently preserves the direction of both the force and torque demand vectors, whilst scaling down their magnitudes to meet the mass flow constraint. A similar saturation scaling has been used on previous satellite programmes; this design means that a large demand on one axis does not cause the actuation on the other axes to be of incorrect sign, which advantageously improves overall robustness.

1.4.3 Description of the Inventive Algorithm

Say the thrust vector $x_1$ has a smallest component smaller than the minimum thrust. The following algorithm for use in the invention scales down the demand until the smallest thrust component is hitting just the minimum constraint:

1. Find index j such with $\min(x_1)=x_1(j)<x$
2. compute $x_2 = \alpha_j x_1 + \beta_j x_0$ where $$\alpha_j = \frac{x_0(j) - x}{x_0(j) - x_1(j)} \quad (1.4.12)$$

$$\beta_j = \frac{x - x_1(j)}{x_0(j) - x_1(j)}$$

where $x_0$ is a null space vector. In the STEP study, the following vector was used:

$$x_0 = \frac{mf}{16} \begin{bmatrix} 1 \\ \vdots \\ 1 \end{bmatrix} \quad (1.4.13)$$

3. Set now $x_1 := x_2$ and goto step 1, else goto 4.
4. Finished. The scaling down factor $\lambda_d$ of the thrust demand is $$\lambda_d = \alpha^{(1)} \alpha^{(2)} \ldots \alpha^{(m)} \quad (1.4.14)$$

where m is the number of loops from step 1. until step 3; it can be shown that m is always less than or equal to 16.

Having regard to the foregoing, thus, in operation of the method of the present invention, the following steps are required to be carried out:

(1) a number of thrust command signals are controllably generated for application to the thrusters (two or more thrusters), (2) comparing the levels of the generated thrust command signals in relation to a number of predetermined constraints, the constraints being of a kind as set out hereinabove for example, (3) identifying which of the thrust demands associated with the thrusters can operate in accordance with the constraints and which of the thrust demands associated with the thrusters can not operate in accordance with the constraints, and (4) balancing the various thrust demands such as to permit each of the thrusters to operate in accordance with the constraints.

In this connection, it is to be understood that the balancing step could be effected as part of the thrust modulation step or alternatively, if desired, it could be effected independently of the thrust modulation step.

1.5 Force/Torque Profile

In order to test and compare the applicability of the abovementioned modulators (see section 1.2) for use in the invention, four different force/torque "open loop" demand profiles are considered by way of example.

1.5.1 Profile #1

Figure 2:
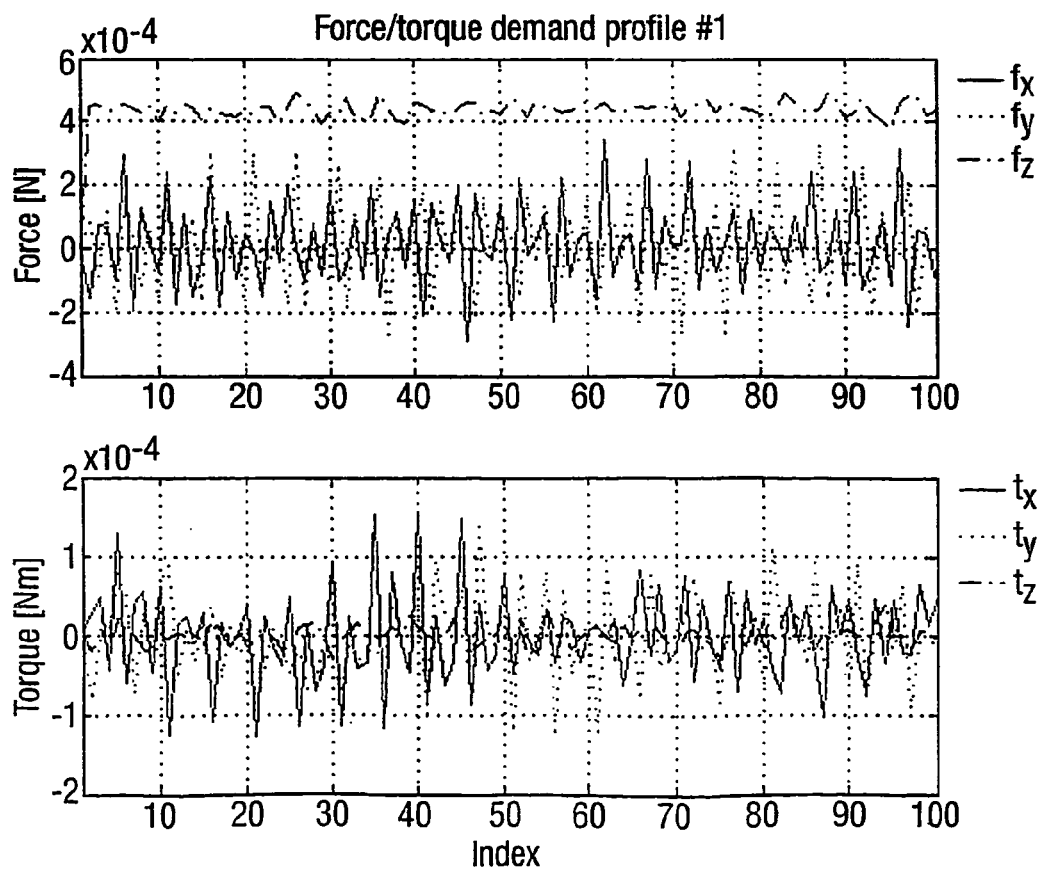

Referring to FIG. 2, there is shown a typical STEP demand profile for a differential accelerometer. It is extracted from closed loop simulation runs with all available disturbances and sensor noises switched on. The torques do not include magnetic disturbances from spacecraft dipole.

1.5.2. Profile #2

Referring next to FIG. 3, there is shown another profile which is the same as profile #1 but additionally it does include magnetic disturbances from spacecraft dipole. For the dipole, in each axis +/−5Am$^2$ is assumed. The first parts of the profile #2-torques are taken from profile #1, and additionally with the Earth magnetic field vector in body co-ordinates extracted from the same simulation run as in profile #1, 8 different magnetic torque sets corresponding to all 8 possible dipole component sign combinations are generated which are subtracted from the torques of profile #1. This results in eight sets of forces and torques, where the forces of each set are the same and the torques differ in magnetic disturbance torque.

1.5.3 Profile #3

Figure 4:
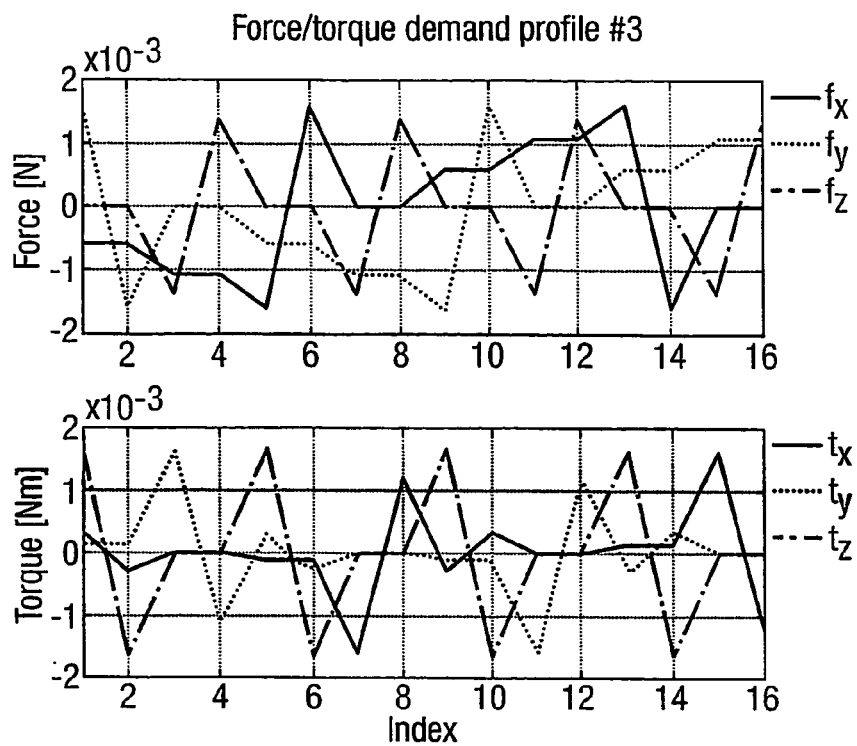

Referring next to FIG. 4, there is shown another typical force/torque demand which can be realised in the invention. The purpose of this profile is to test the modulators under "extreme" conditions. This profile is generated simply by setting one thruster each to the maximal allowable thrust and the remaining thrust is equally distributed among the remaining thrusters. This results in 16 different single force/torque demands.

1.5.4 Profile #4

Figure 5:
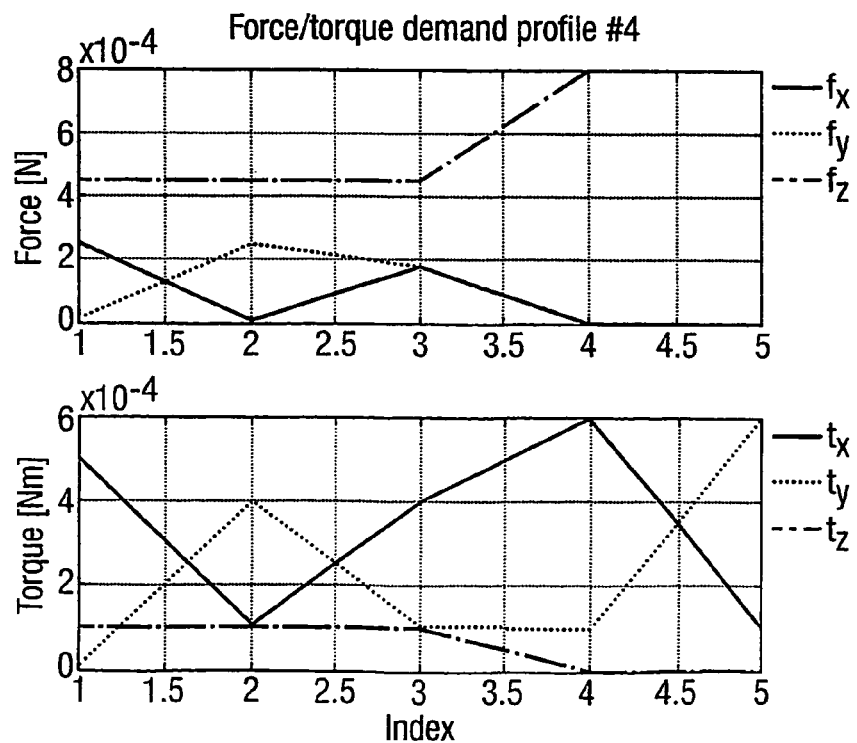

Referring next to FIG. 5, there is shown another typical force/torque demand which can be realised in the invention. This profile is a very special case where all components of the force and torque vector are nonnegative.

1.6 Results and Evaluation of Modulators

All modulators presented in section 1.2 have been tested with the force/torque demand profiles shown in section 1.5. Those profiles have been upscaled by different scaling factors until those demands could no longer by fulfilled because of the limited thrust available. The benefit of using the null space search algorithm in the invention (see section 1.4.1) on top of each modulator (except the linear optimisation modulator which always yields the best possible result) has been analysed. Then, all results are compared with respect to the computation time required in order to judge the various modulators in an overall view.

Since there is a lot of data to check, the results are presented in a compact form: Because the mass flow scaling (section 1.3) guarantees the mass flow constraint to be satisfied and the inventive algorithm presented in section 1.4.2 guarantees the satisfaction of the minimum mass flow constraint on the cost of scaling down the demanded torques and forces, the only performance parameter is the demand down scaling factor $\lambda_d$ (1.4.14). From all demands of one profile, for every modulator the smallest down scaling factor is taken and displayed as performance parameter "$100*(1-\lambda_d)\%$". Clearly, the goal is to achieve a loss of 0%. All modulators are compared with respect to loss of performance and the average computation time required including null space search.

1.6.1 Results 1.6.1.1 Profile #1

Figure 6:
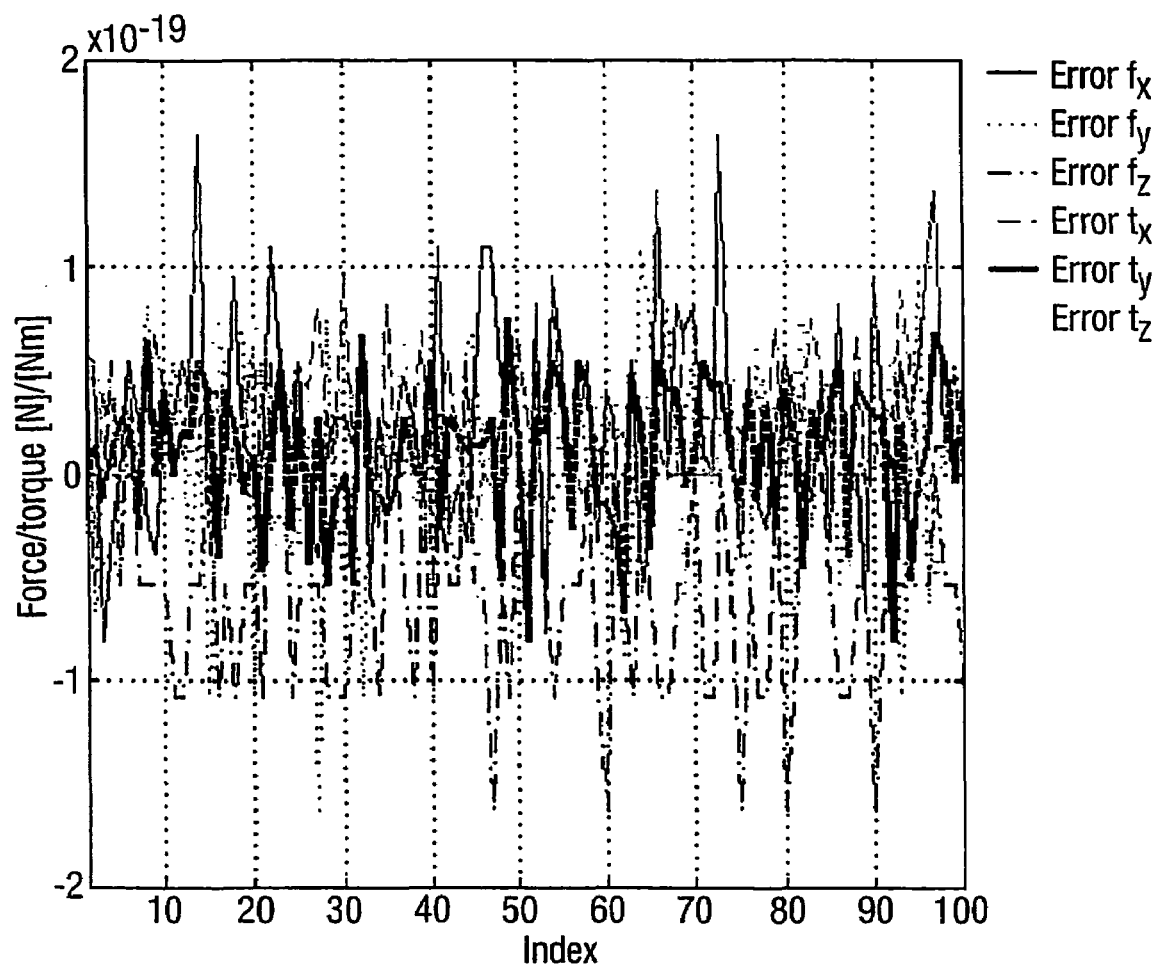
FIG. 6 shows a typical error signal force demand—thrust profile which can be realised by use of the invention.

Referring next to FIG. 6, there is shown a typical error signal force demand-thrust characteristic provided for profile #1. By feeding profile #1 through the linear pseudo-inverse modulator, the error signal between thrust and demand is zero proving that the correct thrust is generated; this means that the demand down scaling factor is one.

Figure 7:
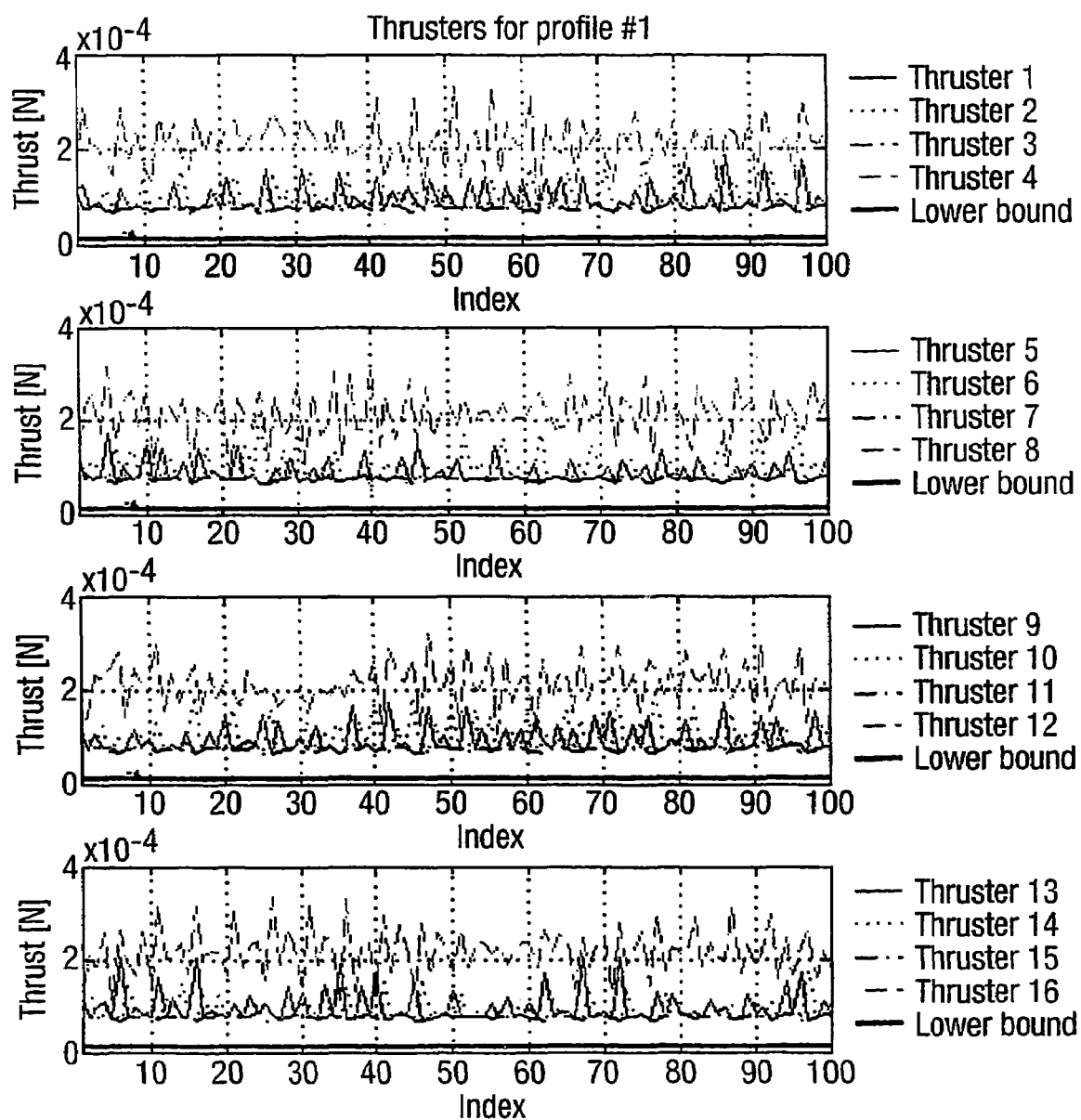
FIG. 7 shows a typical thruster time history profile which can be realised by use of the invention.

Referring next to FIG. 7 there is shown a typical thruster time history as applied to a linear pseudo-inverse modulator for profile #1. Note that in the thruster time history, as shown in the Figure, the minimum mass flow constraint is satisfied for every thruster because each thruster produces a thrust above the "lower bound".

Typical results for other modulators with and without use of the inventive null space search are shown in FIG. 8. In the results, as shown in FIG. 8, two scaled up versions of profile #1 have been tested, one with a factor of 2.0 (solid line) and the other with a factor of 2.5 (dashed line).

Consider the two diagrams of FIG. 8 on the left hand side first (the lower diagrams are zoom-ins of the upper diagram), showing the result without using null space search: Scaling up profile #1 with 2.0, the only modulator generating correctly the thrust is the linear optimisation modulator (rectangle-symbol), which is also by far the slowest algorithm. The so called generic-type extended method (diamond-symbol) comes close (3% loss in demand, this is the highest loss for all demands in profile #1 with scale factor 2.0!), but on the other hand is 30 times faster (it needs only 0.014s computation time) The other kinds of modulator shown lose 20% (linear pseudo-inverse (pentagram-symbol) and so called generic type simple method (star-symbol)) and 38% (non-linear pseudo inverse method, circle symbol).—Scaling up profile #1 with 2.5 shows that the linear optimisation method needs to relax the force and torque demand as well, because there is not sufficient thrust available to generate this demand.

Using the inventive null space search to improve the performance (see diagrams of FIG. 8 on the right hand side) advantageously improves the performance of the linear pseudo-inverse and so called generic type simple method so well that the demand (twice the demand extracted from simulation, thus leaving a good safety margin) can be generated by both methods, without adding significant computation time. This means that the inventive null space search algorithm conveniently converges very fast.

The results are encouraging; therefore, the magnetic disturbance torque has been added (profile #2) to see if the modulators go along with that (higher) demand as well.

1.6.1.2 Profile #2

Referring next to FIG. 9, there are shown some further typical results for the various modulators, with and without use of the inventive null space search, thereby generating thrust according to profile #2.

Again, as shown in the Figure, using the inventive null space search significantly improves the result of the linear and the non-linear pseudo-inverse as well as the so called generic type extended method such that the required demand can be generated up to a level of 1.4 times the profile #2. The physical limitation is below a scaling of 1.8 times profile #2.

The fastest combination is the non-linear pseudo-inverse method plus use of the inventive null space search.

1.6.1.3 Profile #3

Figure 10:
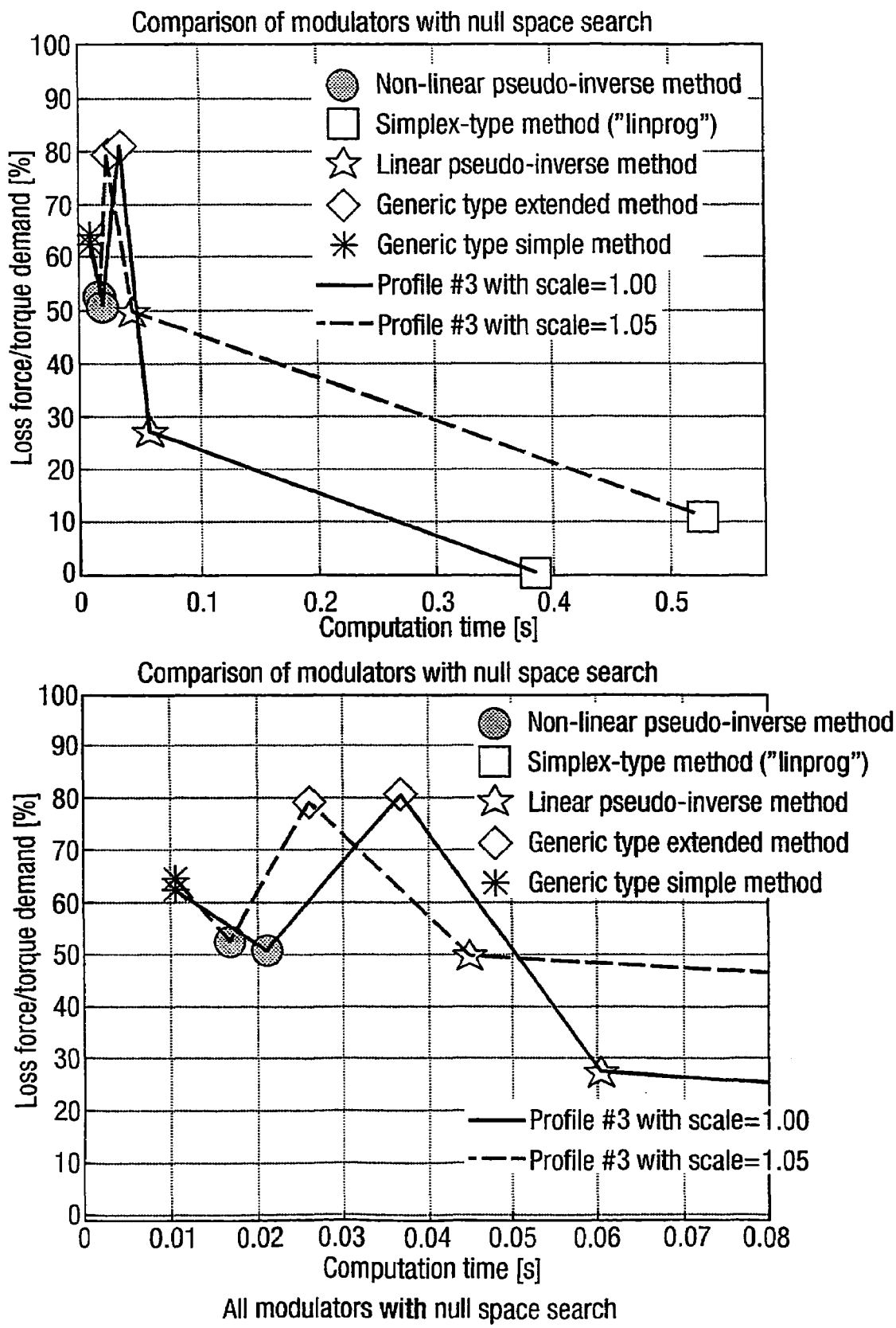

Referring next to FIG. 10, there are shown some further typical results for the various modulators, with and without use of the inventive null space search, thereby generating thrust according to profile #3.

This "extreme" profile (it is not generated by STEP-simulation) is a hard test for all of the modulators used.

With a loss of performance of 30%, as shown, the linear pseudo-inverse method plus use of the inventive null space search yields the best result.

1.6.1.4 Profile #4

Figure 11:
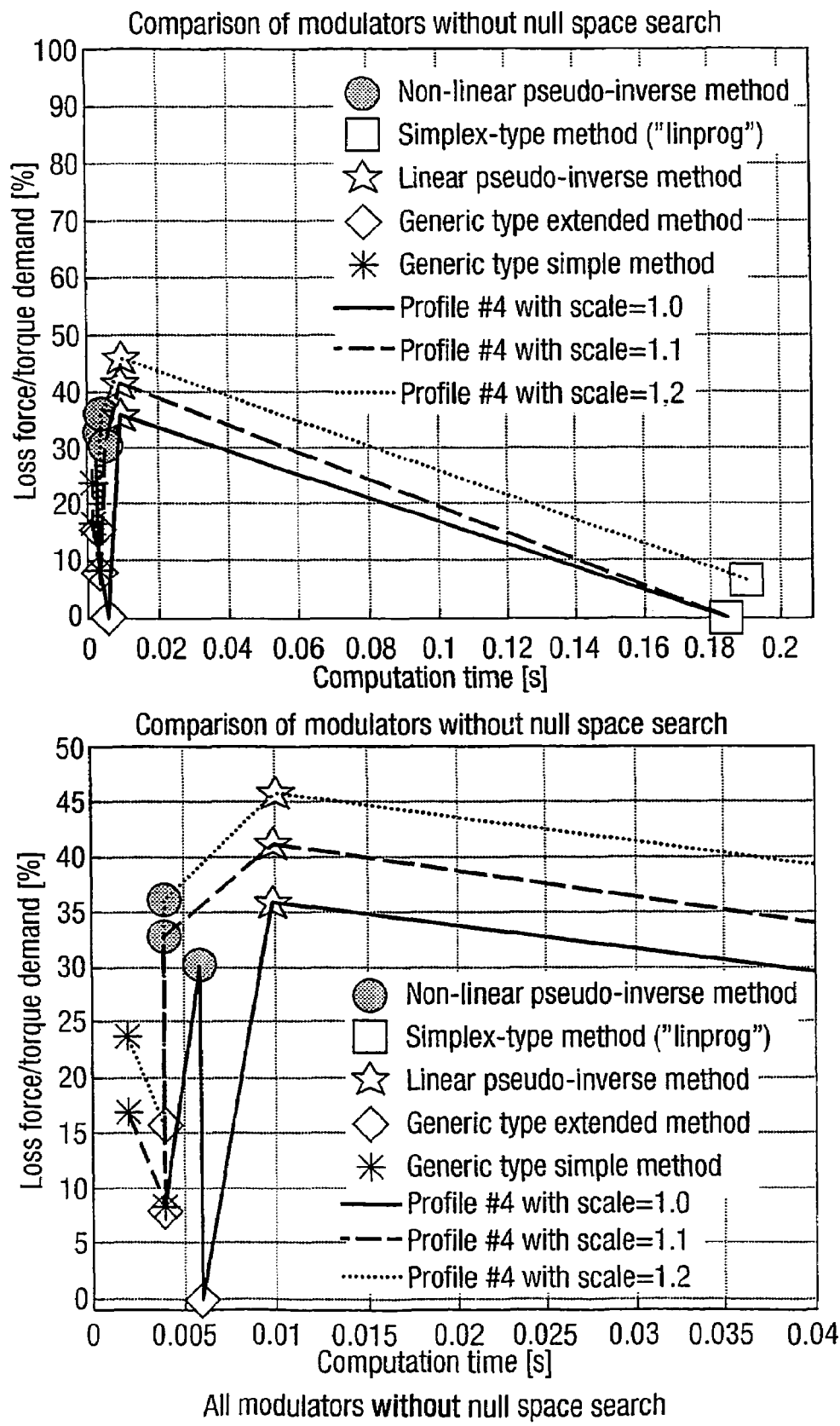

Referring finally to FIG. 11, there are shown some further typical results for the modulators, with and without use of the inventive null space search, thereby generating thrust according to profile #4.

Note that the so called generic-type extended method has been designed particularly for the case of nonnegative components of the force/torque demand and gives by far the best result, with and without use of the inventive null space search. Working out this modulator for all sign combinations on the force/torque demand is promising but has not further been pursued in this phase of the study.

1.7 Conclusion on use of Modulators in the Invention

1) No modulator/null space search combination (apart from the linear optimisation modulator which merely serves as a performance reference) picks up the total available thrust.

2) To add the inventive null space search after any of the modulators significantly improves the result without too much computational effort for all modulators (all profiles). This is a definite benefit associated with the present invention.

3) Based on the results, the best and fastest methods are the non-linear pseudo-inverse method (best for profile #2) and the linear pseudo-inverse method (best choice for profile #1) in combination with the inventive null space search. They come close to the maximal possible performance. For all simulations within STEP, as modulator the linear pseudo-inverse method in combination with inventive null space search has been chosen.

4) Extreme force/torque demands as in profile #3 can only be achieved with a high percentage loss in performance.

However, it is to be appreciated that all conclusions can hardly be generalised and can only be drawn with respect to a certain profile. For a different profile, the conclusions might be different. Therefore, as the results on profile #4 suggest, the design of the so called generic-type extended modulator should be completed, because the analytical formulation allows to derive allowable bounds on the components on any force/torque demand for which this modulator will work.

Having thus described the present invention by reference to a preferred embodiment, it is to be appreciated that the embodiment is in all respects exemplary and that modifications and variations are possible without departure from the spirit and scope of the invention. For example, the precision of the embodiment could possible be improved, if desired, by variation of the number of thrusters, the only critical requirement being that there are at least two thrusters for use in the invention. Further, it is to be appreciated that in the invention the predetermined constraints could be simply modified for application to other kinds of thruster, ion thrusters for example.

Furthermore, it is to be noted that the inventive null space search algorithm of the invention is compatible for application to various kinds of modulator and can thus be used to improve upon different thruster signals proposed by different modulators.

It is also to be appreciated that the thrust demand balancing step could be effected in dependence upon the modulation step, or alternatively, the balancing step could be effected wholly independently of the modulation step.

It is to be understood that the number of components on any force/torque demand, for example, for conversion into thrust demands could readily be varied to realise the technical effect of the invention.

The present invention finds utility for various applications where thrust demands are required to be balanced, for example balancing thrust demands in spacecraft systems.

The invention claimed is:

1. A method of balancing thrust demands in a spacecraft, said method comprising the steps of:
   (a) controllably generating a number of thrust command signals for application to a plurality of thrusters;
   (b) comparing the levels of the generated thrust command signals in relation to a number of predetermined constraints;
   (c) identifying which of the thrust demands associated with said plurality of thrusters can operate in accordance with said predetermined constraints and which of the thrust demands associated with said plurality of thrusters can not operate in accordance with said predetermined constraints; and
   (d) applying a predetermined combination of null space vectors to balance the various thrust demands such as to permit each of the thrusters to operate in accordance with said predetermined constraints.

2. A method as claimed in claim 1, wherein said balancing step comprises shifting a predetermined amount of thrust demand associated with particular thrusters operating in accordance with said predetermined constraints to one or more of the thrusters which do not operate in accordance with said predetermined constraints.

3. A computer readable medium encoded with a computer program for configuring a data processing system to balance thrust demands in a spacecraft, by performing the following steps:
   (e) controllably generating a number of thrust command signals for application to a plurality of thrusters;
   (f) comparing the levels of the generated thrust command signals in relation to a number of predetermined constraints;
   (g) identifying which of the thrust demands associated with said plurality of thrusters can operate in accordance with said predetermined constraints and which of the thrust demands associated with said plurality of thrusters can not operate in accordance with said predetermined constraints; and
   (h) applying a predetermined combination of null space vectors to balance the various thrust demands such as to permit each of the thrusters to operate in accordance with said predetermined constraints.

4. A method as claimed in claim 1, wherein said predetermined constraints are selected so that (i) the thrust demand associated with each of said plurality of thrusters is more than a predetermined value and (ii) the total mass flow associated with said plurality of thrusters is constant.

5. A method as claimed in claim 1, further comprising the step of modulating a number of forces/torques to provide said number of thrust command signals.

6. A method as claimed in claim 5, wherein said balancing step and said modulation step are effected independently.

7. A method as claimed in claim 5, wherein said modulation step is effected by means of a non-linear pseudo-inverse modulator.

8. A spacecraft system for balancing thrust demands comprising:
   means for controllably generating a number of thrust command signals for application to a plurality of thrusters;
   means for comparing the levels of the generated thrust command signals in relation to a number of predetermined constraints;
   means for identifying which of the thrust demands associated with said plurality of thrusters can operate in accordance with said predetermined constraints and which of the thrust demands associated with said plurality of thrusters can not operate in accordance with said predetermined constraints; and
   means for applying a predetermined combination of null space vectors to balance the various thrust demands such as to permit each of the thrusters to operate in accordance with said predetermined constraints.

9. A spacecraft system comprising:
   a plurality of thrusters;
   data processing means; and
   a computer readable medium encoded with a program for causing said data processor to perform the following steps:
   (i) controllably generating a number of thrust command signals for application to a said plurality of thrusters;
   (j) comparing the levels of the generated thrust command signals in relation to a number of predetermined constraints;
   (k) identifying which of the thrust demands associated with said plurality of thrusters can operate in accordance with said predetermined constraints and which of the thrust demands associated with said plurality of thrusters cannot operate in accordance with said predetermined constraints; and
   (l) applying a predetermined combination of null space vectors to balance the various thrust demands such as to permit each of the thrusters to operate in accordance with said predetermined constraints.

* * * * *